No. 676,234. Patented June 11, 1901.
T. HUMPAGE & H. I. JACQUES.
TOOTHED GEARING.
(Application filed Dec. 1, 1900.)

(No Model.)

WITNESSES.

INVENTORS.

THE NORRIS PETERS CO., PHOTO-LITHO., WASHINGTON, D. C.

UNITED STATES PATENT OFFICE.

THOMAS HUMPAGE AND HERBERT INNES JACQUES, OF BRISTOL, ENGLAND.

TOOTHED GEARING.

SPECIFICATION forming part of Letters Patent No. 676,234, dated June 11, 1901.

Original application filed December 30, 1897, Serial No. 664,505. Divided and this application filed December 1, 1900. Serial No. 38,338. (No model.)

*To all whom it may concern:*

Be it known that we, THOMAS HUMPAGE and HERBERT INNES JACQUES, subjects of Her Majesty the Queen of Great Britain, residing at Ashton Gate, Bristol, England, have invented a certain new and useful Improvement in Toothed Gearings, of which the following is a specification.

Our invention relates to an improvement in toothed gearings, the present application being a divisional one on that filed in the United States Patent Office on the 30th day of December, 1897, under Serial No. 664,505.

The gear in question is principally adapted for the reduction of speed from high-speed motors—such as electric, steam, oil, and the like—and as a substitute where the ordinary belting, chain-gear, spur, bevel, or worm gear is used for reducing or increasing the speed of component parts of machines, the gearing in question being simple in construction and operation, strong and durable, and comparatively inexpensive.

The invention is the same as that for which Letters Patent were granted to us in Great Britain November 14, 1892, No. 20,542, and is an improvement on the form of construction shown and described in a prior British patent granted to Thomas Humpage, one of the applicants herein, on November 9, 1887, No. 15,289, and said invention is fully described in the following specification and drawings, in which latter—

Figure 1:
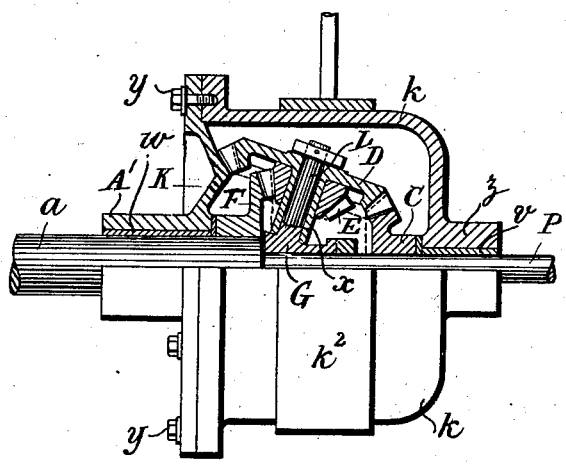
Figure 2:
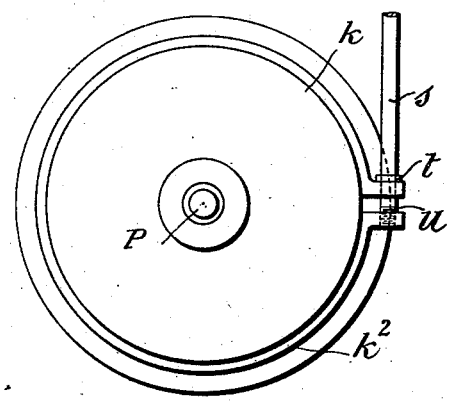

Figure 1 is a sectional elevation of the improved gearing, and Fig. 2 is an end view thereof.

In this form of our invention the high-speed shaft P has secured to it a bevel gear-wheel C, the teeth of which are in gear with a bevel gear-wheel D, capable of freely turning on the arm L of a cross-head G, which is carried by and can turn freely on the shaft P. A bevel-gear E is rigidly secured to the gear D in any suitable way. As shown in the drawings, it is attached to the sleeve $x$, surrounding the arm L and forming part of gear D. The gear D in turn gears with bevel-gear K, having a boss A', carried by and turning freely on a bushing or sleeve $w$ of the slow-speed shaft $a$. Such gear K is attached by screws $y$ to a casing $k$, and said casing has a boss $z$ and is capable of rotating freely on a sleeve or bushing $v$ of the high-speed shaft. The gear E gears with a bevel-gear F, fixed on the slow-speed shaft $a$. The casing $k$ acts as a protection against dirt and may be filled with oil, if desired. Around such casing is a brake-band $k^2$, the ends of which may be drawn together by a rotatable rod $s$, having a fixed collar $t$ bearing on one of the ends and a screw-thread $u$ engaging with the other.

The action of the gear is as follows: The wheel C gears with D, which in turn gears with K, and E gearing with F when the shaft P rotates C drives D. As, however, the gear K is fixedly held by the brake $k^2$ and cannot rotate, it acts as a fulcrum or fulcrum-wheel, and the wheels D E and cross-head G are forced to turn, the former on the arm L and the latter on the shaft P. This compound movement of the wheels D E—viz., of rotation on their own axes and bodily around the shaft P—causes E to drive F in the same direction at a predetermined speed according to the ratio of the gearing. By holding the shaft $a$ and releasing the brake-band $k^2$ the gear K and casing $k$ will rotate at yet another speed, and power may be taken off these by a belt or in other ways.

What we claim is—

1. In a gearing, and in combination, a shaft, a wheel fixed thereto, an armed cross-head, means for supporting same so that it may freely revolve, a pair of gear-wheels fixed together and free to revolve as one on the cross-head, one of said wheels engaging the wheel on the shaft, a second shaft, a gear-wheel fixed thereto and engaging with the second gear-wheel carried by the cross-head, a further gear-wheel engaging the first gear-wheel on the cross-head and free to rotate, and means for holding such free gear-wheel when it is required to act as a fulcrum-wheel.

2. In a gearing, and in combination, a shaft, a wheel fixed thereto, an armed cross-head, means for supporting same so that it may freely revolve, a pair of gear-wheels fixed together and free to revolve as one on the cross-head, one of said wheels engaging the wheel on the shaft, a second shaft, a gear-wheel fixed thereto and engaging with the second gear-wheel carried by the cross-head, a further gear-wheel engaging the first gear-wheel on the cross-head and free to rotate, a casing carried by the last-named free gear-wheel and inclosing all the gears, a brake-band for controlling the movement of such free gear-wheel, and means for tightening and releasing such band.

In testimony whereof we have hereunto set our hands in the presence of two subscribing witnesses.

THOMAS HUMPAGE.
HERBERT INNES JACQUES.

Witnesses:
JOHN JAMES DODD,
LIONEL EDWARD FELLOWS.